(12) United States Patent
Koiso

(10) Patent No.: US 12,323,547 B2
(45) Date of Patent: Jun. 3, 2025

(54) VEHICLE DEVICE AND METHOD EXECUTED BY VEHICLE DEVICE

(71) Applicant: JVCKENWOOD Corporation, Yokohama (JP)

(72) Inventor: Hisashi Koiso, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 445 days.

(21) Appl. No.: 17/932,689

(22) Filed: Sep. 16, 2022

(65) Prior Publication Data

US 2023/0017282 A1      Jan. 19, 2023

Related U.S. Application Data

(63) Continuation of application No. PCT/JP2021/034702, filed on Sep. 22, 2021.

(30) Foreign Application Priority Data

Dec. 14, 2020 (JP) ................................. 2020-206569

(51) Int. Cl.
*H04W 4/48* (2018.01)
*G06V 20/59* (2022.01)
*H04M 1/72412* (2021.01)

(52) U.S. Cl.
CPC ...... *H04M 1/72412* (2021.01); *G06V 20/593* (2022.01); *H04W 4/48* (2018.02)

(58) Field of Classification Search
CPC .................................. H04W 1/72; H04W 4/48
See application file for complete search history.

(56) References Cited

U.S. PATENT DOCUMENTS

2013/0074112 A1* 3/2013 Hyde ................. H04N 21/2146
725/25
2018/0350366 A1   12/2018 Park et al.
(Continued)

FOREIGN PATENT DOCUMENTS

JP      2008-042577 A      2/2008
JP      2009-284442 A     12/2009
(Continued)

OTHER PUBLICATIONS

International Search Report for the corresponding PCT Application No. PCT/JP2021/034702 mailed Dec. 14, 2021, 6 pages.

*Primary Examiner* — Michael T Vu
(74) *Attorney, Agent, or Firm* — Shih IP Law Group, PLLC

(57) ABSTRACT

A passenger detector identifies biometric information of a passenger on board a vehicle from a video captured by a camera that captures the inside of the cabin of the vehicle and specifies the boarding position of the passenger. A determiner determines whether or not a mobile terminal associated with the biometric information identified by the passenger detector is in a state of being connectable by near field communication. In a case where there is a plurality of mobile terminals determined by the determiner to be in a state of being connectable by near field communication, a decider decides a mobile terminal to be connected by near field communication on the basis of boarding positions of a plurality of passengers specified by a plurality of pieces of biometric information associated with the plurality of mobile terminals. A communication controller connects the mobile terminal decided by the decider and the vehicle device by near field communication.

5 Claims, 7 Drawing Sheets

(56) References Cited

U.S. PATENT DOCUMENTS

2020/0271467 A1* 8/2020 Yoshida ................ H04W 4/024
2021/0279740 A1* 9/2021 Choi ....................... H04W 4/44

FOREIGN PATENT DOCUMENTS

JP    2011-114741 A    6/2011
JP    2014-004860 A    1/2014

* cited by examiner

FIG. 3

| No. | FACE AUTHENTICATION DATA | MOBILE TERMINAL NAME | CONNECTION STATE ||||| AV SOURCE | SEAT POSITION | AIR CONDITIONING STATE | ... |
|---|---|---|---|---|---|---|---|---|---|---|
| | | | HANDS-FREE | MUSIC REPRODUCTION | VIDEO REPRODUCTION | DATA COMMUNICATION | | | | |
| 1 | FR0001 | AAA | ○ | ○ | | ○ | MOBILE TERMINAL: MUSIC REPRODUCTION | XXX | YYY | ... |
| 2 | FR0002 | BBB | ○ | | ○ | | TELEVISION | XXX | YYY | ... |
| 3 | FR0003 | CCC | ○ | ○ | | | MOBILE TERMINAL: MUSIC REPRODUCTION | XXX | YYY | ... |
| 4 | FR0004 | DDD | ○ | ○ | | ○ | RADIO | XXX | YYY | ... |
| 5 | FR0005 | EEE | ○ | | ○ | | MOBILE TERMINAL: VIDEO REPRODUCTION | XXX | YYY | ... |
| 6 | FR0006 | FFF | ○ | | | | | XXX | YYY | ... |
| 7 | FR0007 | GGG | ○ | ○ | | ○ | MOBILE TERMINAL: DATA COMMUNICATION | XXX | YYY | ... |
| 8 | FR0008 | HHH | ○ | ○ | | | | XXX | YYY | ... |
| 9 | FR0009 | III | ○ | | | | | XXX | YYY | ... |
| ... | ... | ... | ... | ... | ... | ... | ... | ... | ... | ... |

VEHICLE DEVICE AND METHOD EXECUTED BY VEHICLE DEVICE

CROSS-REFERENCE TO RELATED APPLICATION

This application is a Continuation of International Application No. PCT/JP2021/034702, filed on Sep. 22, 2021, which in turn claims the benefit of Japanese Application No. 2020-206569, filed on Dec. 14, 2020, the disclosures of which Application is incorporated by reference herein.

BACKGROUND OF THE INVENTION

1. Field

The present invention relates to a vehicle device to which a video captured by a camera is input, and a method executed by the vehicle device.

2. Description of the Related Art

It is prohibited by law or ordinance for a driver to hold a mobile terminal (mainly smartphones and feature phones) and use the mobile terminal for a call or the like while driving an automobile. As a countermeasure against this, a method is used in which a mobile terminal and a hands-free compatible device on the vehicle side are connected by near field communication, and a call and an operation are performed in a hands-free manner.

Normally, a hands-free vehicle-side device is set to automatically connect to a most recently connected mobile terminal. Therefore, when a driver different from a previous driver drives, automatic connection is not performed, and it is necessary to perform an operation of selecting a mobile terminal of the new driver. In addition, if the new driver is driving without noticing, there is an inconvenience that the hands-free function cannot be used.

Meanwhile, there has been proposed a method of automatically establishing connection with a mobile terminal by referring to a table associating user's face information with identification information of mobile terminals and identifying the driver's face captured by a driver's seat camera (see, for example, Patent Literature 1). Note that this driver's seat camera cannot capture the inside of the entire cabin including fellow passengers other than the driver.

Patent Literature 1: JP 2008-042577 A

For example, when the driver temporarily gets off the vehicle, it is convenient that the connection destination of the hands-free compatible device on the vehicle side is switched from the mobile terminal of the driver to the mobile terminal of the fellow passenger sitting on the passenger seat.

SUMMARY OF THE INVENTION

A vehicle device according to an aspect of the present embodiment includes: a passenger detector structured to identify a passenger on board a vehicle from a video captured by a camera that captures an inside of a cabin of the vehicle and specify a boarding position of the passenger identified; a determiner structured to determine whether or not a mobile terminal associated with the passenger identified by the passenger detector is in a state of being connectable by near field communication; a decider structured to decide a mobile terminal to be connected by the near field communication on a basis of boarding positions of a plurality of passengers associated with a plurality of mobile terminals in a case where there is the plurality of mobile terminals determined by the determiner to be in a state of being connectable by the near field communication; and a communication controller structured to connect the mobile terminal decided by the decider and the vehicle device by the near field communication.

Another aspect of the present embodiment is a method executed by a vehicle device. According to this method, the vehicle device executes: identifying a passenger on board a vehicle from a video captured by a camera that captures an inside of a cabin of the vehicle and specifying a boarding position of the passenger identified; determining whether or not a mobile terminal associated with the passenger identified is in a state of being connectable by near field communication; deciding a mobile terminal to be connected by the near field communication on a basis of boarding positions of a plurality of passengers associated with a plurality of mobile terminals in a case where there is the plurality of mobile terminals determined to be in a state of being connectable by the near field communication; and connecting the mobile terminal decided and the vehicle device by the near field communication.

Note that arbitrary combinations of the above components and modifications of the expressions of the present embodiment between devices, methods, systems, recording media, computer programs, and the like are also effective as aspects of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 is a diagram illustrating an example of a user list held in a user list holder.

DETAILED DESCRIPTION OF THE PREFERRED EMBODIMENT

The invention will now be described by reference to the preferred embodiments. This does not intend to limit the scope of the present invention, but to exemplify the invention.

The present embodiment relates to a vehicle hands-free control system for implementing a hands-free function of a mobile terminal carried by a passenger of a vehicle. The vehicle hands-free control system according to the embodiment uses a camera that captures not only the driver's seat but also the inside of the cabin including the passenger seat and the rear seat in a wide range.

Figure 1:
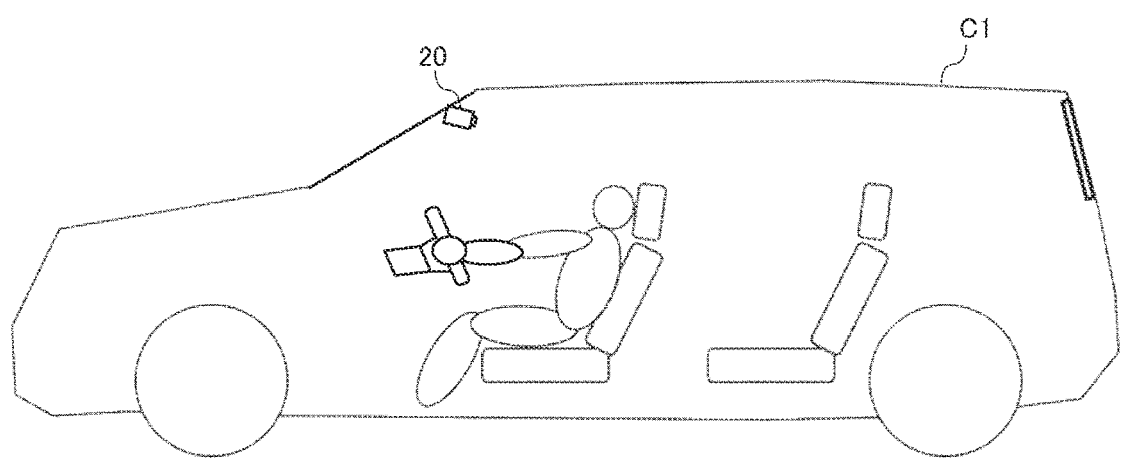
FIG. 1 is a diagram illustrating an installation example of a camera in a vehicle.

FIG. 1 is a diagram illustrating an installation example of a camera 20 in a vehicle C1. In the example illustrated in FIG. 1, the camera 20 is attached to a rear-view mirror. As the camera 20, a camera used for a dashboard camera or an in-cabin monitoring system may be used, or a camera dedicated to a hands-free control system may be prepared.

Figure 2:
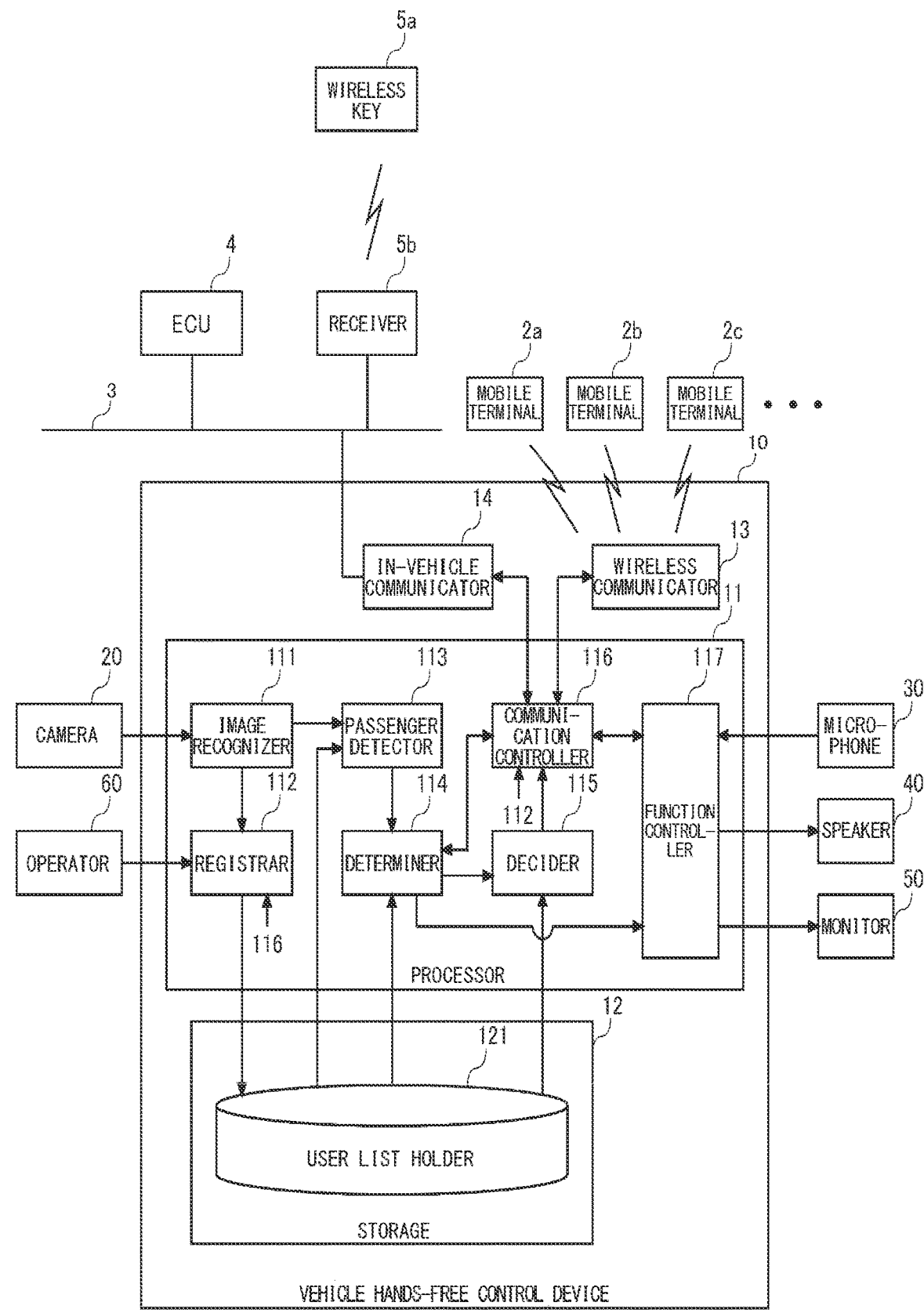
FIG. 2 is a diagram for describing a configuration example of a vehicle hands-free control system according to an embodiment.

FIG. 2 is a diagram for describing a configuration example of a vehicle hands-free control system 1 according to the embodiment. The vehicle hands-free control system 1 includes a vehicle hands-free control device 10, a camera 20, a microphone 30, a speaker 40, a monitor 50, and an operator 60.

The camera 20 captures the inside of the cabin, and outputs the captured video to the vehicle hands-free control device 10. The camera 20 may be a visible light camera or an infrared camera. Furthermore, a camera capable of capturing both the visible light region and the infrared region may be used.

The camera 20 includes a lens, an imaging element, and a signal processing circuit. As the imaging element, for example, a complementary metal oxide semiconductor (CMOS) image sensor or a charge coupled device (CCD) image sensor can be used. The imaging element converts light incident through the lens into an electrical video signal and outputs the video signal to the signal processing circuit. In the case of capturing an infrared video, an imaging element having sensitivity in an infrared region is used. The signal processing circuit performs signal processing such as A/D conversion and noise removal on the video signal input from the imaging element, and outputs the video signal to the vehicle hands-free control device 10.

The vehicle hands-free control device 10 includes a processor 11, a storage 12, a wireless communicator 13, and an in-vehicle communicator 14. The vehicle hands-free control device 10 may be mounted in a dedicated housing, or may be incorporated as one function of a car navigation system, a display audio, a dashboard camera, or an in-cabin monitoring system.

The processor 11 includes an image recognizer 111, a registrar 112, a passenger detector 113, a determiner 114, a decider 115, a communication controller 116, and a function controller 117. The function of the processor 11 can be implemented by cooperation of hardware resources and software resources or only hardware resources. As hardware resources, a CPU, a ROM, a RAM, a graphics processing unit (GPU), a digital signal processor (DSP), an image signal processor (ISP), an application specific integrated circuit (ASIC), a field-programmable gate array (FPGA), and other LSIs can be used. A program such as firmware can be used as the software resource.

The storage 12 includes a non-volatile recording medium such as a hard disk drive (HDD) or a solid state drive (SSD), and includes a user list holder 121. The user list holder 121 is a list in which face authentication data of passengers of the vehicle and information on mobile terminals 2 possessed by the passengers are registered in association with each other. In the user list, not only a person who possesses a driver's license but also a person who does not possess a driver's license can be registered.

FIG. 3 is a diagram illustrating an example of a user list held in the user list holder 121. In the user list illustrated in FIG. 3, face authentication data and information on the mobile terminals 2 are registered in association with each other for each registrant. As the information on the mobile terminals 2, names, connection states, and AV sources of the mobile terminals 2 are registered. As the connection states, use/non-use of a hands-free call, presence/absence of automatic reproduction of music, presence/absence of automatic reproduction of a video, and use/non-use of data communication are registered. The use/non-use of data communication defines whether or not the vehicle hands-free control device 10 performs data communication using the mobile phone network (4G/5G) through the mobile terminal 2. For example, data communication may be used to stream music or video.

The AV source indicates a source of music data or video data when there is music reproduction or video reproduction. For example, a music file or a video file stored in the mobile terminal 2 can be used as the AV source. In addition, radio broadcasting or television broadcasting received by a tuner mounted on a car navigation system or a display audio can be used. Further, an audio file or a video file recorded on a CD/DVD inserted into a car navigation system or a display audio can be used.

Furthermore, an in-vehicle environment other than the AV environment can be registered for each registrant. For example, a seat position, an air conditioning state, and the like in a case of sitting on the driver's seat or the passenger seat can be registered. Switching between cooling, heating, and air blowing, a set temperature, and the like can be registered as the air conditioning state. Furthermore, the position of the side mirror or the like can be registered as the in-vehicle environment.

Return to FIG. 2. The image recognizer 111 searches for faces of persons using an identifier for face detection of persons in frame images of a video input from the camera 20. As the identifier for face detection, dictionary data generated by learning a large number of images in which faces of persons appear is used. For face recognition, for example, Haar-like features, histogram of gradients (HOG) features, local binary patterns (LBP) features, or the like can be used.

The registrar 112 registers the face authentication data of the passengers and the information on the mobile terminals 2 in the user list. A passenger who desires registration to the user list operates the operator 60 to activate the registration mode while sitting on the front seat. When the registration mode is activated, the registrar 112 instructs the image recognizer 111 to extract the feature of the passenger's face area detected in the frame image and generate face authentication data for identifying the passenger.

When the face authentication data of the passenger from the image recognizer 111 is acquired, the registrar 112 causes the communication controller 116 to start the pairing processing with the mobile terminal 2 possessed by the passenger. The vehicle hands-free control device 10 and the mobile terminal 2 can be connected by near field communication. Bluetooth (registered trademark) or Wi-Fi (registered trademark) can be used as the near field communication. Hereinafter, the present embodiment assumes an example of using Bluetooth.

The registrar 112 guides the pairing procedure of the mobile terminal 2 from at least one of the speaker 40 and the monitor 50. First, the registrar 112 provides guidance to turn on the Bluetooth function. The registrar 112 instructs the communication controller 116 to transmit a signal (for example, an advertisement packet) for notifying the surroundings of its own presence from the wireless communicator 13. When the mobile terminal 2 scans the signal, the vehicle hands-free control device 10 is displayed as a connectable device on the screen of the mobile terminal 2. When the passenger selects the vehicle hands-free control device 10 in the screen, pairing processing is executed between the mobile terminal 2 and the vehicle hands-free control device 10. In the pairing processing, an encryption key used to encrypt communication data between the two is exchanged.

When the pairing with the mobile terminal 2 is completed, the registrar 112 acquires the name and identification information of the mobile terminal 2 via the communication controller 116. The name of the mobile terminal 2 is preferably a name that is easy for the user to understand. For example, a user account name used by the passenger in various services in the mobile terminal 2 may be used. When the name acquired from the mobile terminal 2 is a name that is difficult to understand, the passenger can edit the name of the mobile terminal 2 from the operator 60.

The passenger inputs the above-described setting items of the connection state from the operator 60. The registrar 112 registers the face authentication data, the name of the mobile terminal, and each item of the connection state in association with each other in the user list in the user list holder 121. Note that the passenger can also input the setting items of the in-vehicle environment described above. In that case, each item of the in-vehicle environment is also registered in association with each other.

The passenger detector 113 identifies the faces of the passengers on board the vehicle C1 from the video input from the camera 20. Specifically, the passenger detector 113 collates feature data of a passenger's face detected in a frame image by the image recognizer 111 with a plurality of pieces of face authentication data registered in the user list to specify the passenger's face.

The passenger detector 113 specifies a boarding position of at least one passenger boarding the vehicle C1. Specifically, the passenger detector 113 specifies, for each passenger, whether the boarding position is the driver's seat, the passenger seat, the right rear seat, the left rear seat, or the rear center seat.

Figure 4:
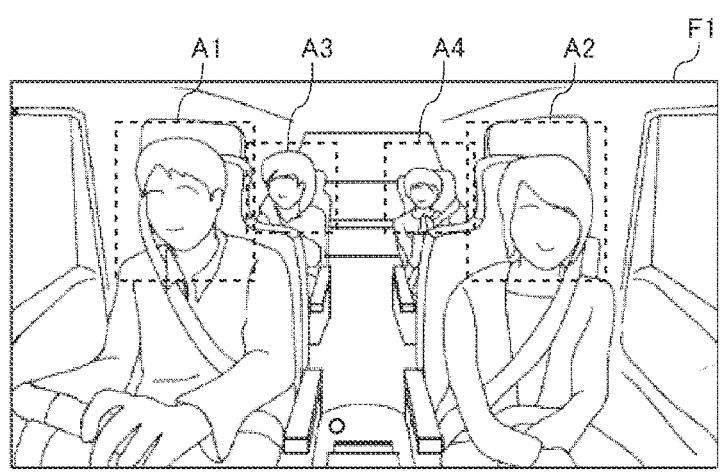
FIG. 4 is a diagram illustrating a detection example of passengers and boarding positions in a vehicle.

FIG. 4 is a diagram illustrating a detection example of passengers and boarding positions in the vehicle C1. In the frame image F1 illustrated in FIG. 4, the image recognizer 111 recognizes that a passenger is present in the driver's seat when detecting the face of the person in the detection area A1 for the driver's seat passenger. Similarly, when detecting the face of the person in the detection area A2 for the passenger seat passenger, the image recognizer 111 recognizes that the passenger is present in the passenger seat. Similarly, when detecting the face of the person in the detection area A3 for the right rear seat passenger, the image recognizer 111 recognizes that the passenger is present in the right rear seat. Similarly, when detecting the face of the person in the detection area A4 for the left rear seat passenger, the image recognizer 111 recognizes that the passenger is present in the left rear seat. Note that, although it does not exist in the cabin illustrated in FIG. 4, in a case of a vehicle having a rear center seat, a detection area for the rear center seat passenger is also set.

Return to FIG. 2. The determiner 114 determines whether or not the mobile terminal 2 associated with the passenger's face identified by the passenger detector 113 is in a state of being connectable by near field communication. When the communication controller 116 recognizes the mobile terminal 2 as a connectable device, the determiner 114 determines that the mobile terminal 2 is in a connectable state. In a case where the identified passenger does not carry the mobile terminal 2, in a case where the mobile terminal 2 is powered off, or in a case where the Bluetooth function is turned off, the determiner 114 determines that the mobile terminal 2 is not in a connectable state.

In a case where there is a plurality of mobile terminals 2 determined to be in a connectable state by the determiner 114 (that is, in a case where there are a plurality of passengers), the decider 115 decides a mobile terminal 2 to be connected on the basis of boarding positions of a plurality of passengers specified by a plurality of pieces of face authentication data associated with the plurality of mobile terminals 2. Specifically, the decider 115 decides, as the mobile terminal 2 to be connected, the mobile terminal 2 associated with the face authentication data of the passenger sitting on the seat having the highest priority among the seats where the passengers are seated.

For example, the priority order of the seats is set to driver's seat: 1, passenger seat: 2, right rear seat: 3, and left rear seat: 4. In this example, when the driver gets off the vehicle, the mobile terminal 2 of the passenger sitting on the passenger seat is connected to the vehicle hands-free control device 10. The priority order of the seats can be changed. For example, when a person with a high position sits on the right rear seat, the priority may be set to right rear seat: 1.

The wireless communicator 13 includes an antenna and transmits and receives signals to and from the mobile terminal 2 by a near field communication method. The in-vehicle communicator 14 executes communication processing for connecting to an in-vehicle network 3. As the in-vehicle network 3, a controller area network (CAN), a local interconnect network (LIN), Ethernet (registered trademark), or the like can be used. Various electronic control units (ECUs) 4 for controlling an engine and accessories are connected to the in-vehicle network 3. For example, an ECU for controlling a position of a seat position is also connected. A controller of an air conditioner system in the vehicle C1 can also be connected to the in-vehicle network 3.

In the example illustrated in FIG. 2, a receiver 5b of a wireless key system is connected to the in-vehicle network 3. The receiver 5b is a receiver for receiving a radio signal from a wireless key (also referred to as a smart key, an intelligence key, a remote control key, or the like) 5a possessed by a driver.

The communication controller 116 controls the wireless communicator 13 to perform pairing processing with the mobile terminal 2, connection/disconnection processing with the paired mobile terminal 2, management of paired devices, and the like. Furthermore, the communication controller 116 controls the in-vehicle communicator 14 to transmit and receive control signals to and from various ECUs 4 and devices connected to the in-vehicle network 3.

The function controller 117 controls various functions (for example, a hands-free call function, an audio reproduction function, a video reproduction function, and the like) of the vehicle hands-free control system 1. The function controller 117 can also control functions in the mobile terminal 2 connected by near field communication.

The microphone 30 collects sound in the vehicle C1 and outputs the sound to the function controller 117. In the present embodiment, the microphone 30 can be used for hands-free call. A plurality of microphones 30 may be installed in the vehicle C1. For example, one may be installed in each of the front seat and the rear seat, or may be installed for each seat. At least one microphone 30 may be a microphone of a car navigation system, a display audio, a dashboard camera, or an in-cabin monitoring system.

The speaker 40 reproduces and outputs audio data supplied from the function controller 117. In the present embodiment, the speaker 40 can be used for hands-free call. A plurality of speakers 40 may be installed in the vehicle C1. For example, one may be installed in each of the front seat and the rear seat, or may be installed for each seat. At least one speaker 40 may be a speaker of a car navigation system, a display audio system, a car audio system, a dashboard camera, or an in-cabin monitoring system.

The monitor 50 reproduces and displays video data supplied from the function controller 117. As the monitor 50, a liquid crystal display, an organic EL display, a mini LED display, or the like can be used. A plurality of monitors 50 may be installed in the vehicle C1. For example, one may be installed in each of the front seat and the rear seat, or may be installed for each seat. At least one monitor 50 may be a monitor of a car navigation system, a display audio, a dashboard camera, or an in-cabin monitoring system.

EXAMPLE 1

Figure 5:
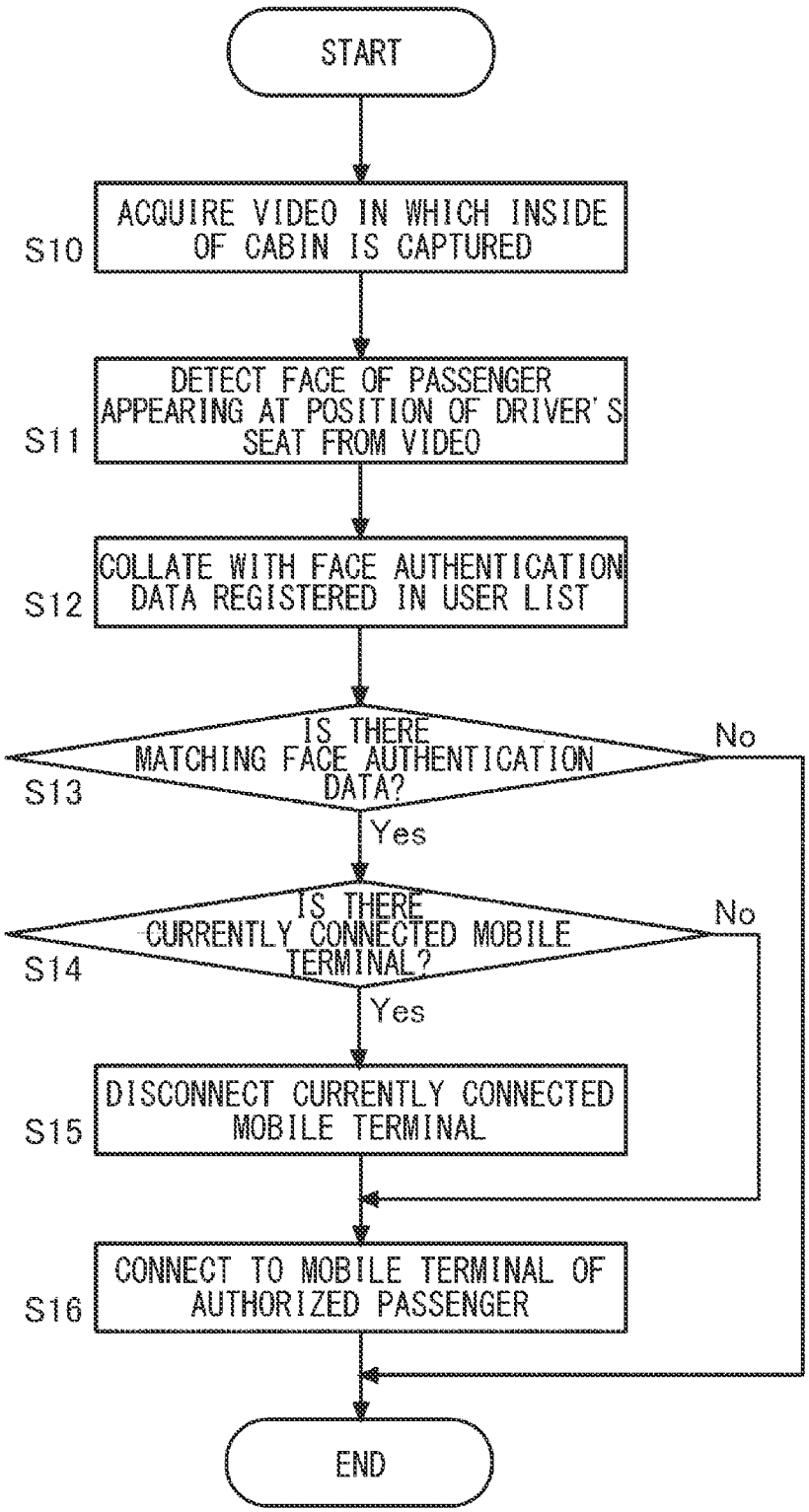
FIG. 5 is a flowchart illustrating a flow of a face authentication process of the vehicle hands-free control device according to Example 1.

FIG. 5 is a flowchart illustrating a flow of a face authentication process of the vehicle hands-free control device 10 according to Example 1. Example 1 is an example of a case where only the driver boards the vehicle C1. The processor 11 acquires a video of the inside of the cabin captured by the camera 20 (S10). The image recognizer 111 detects the face of the passenger appearing at the position of the driver's seat from the frame image of the acquired video (S11).

The passenger detector 113 collates the detected feature data of the passenger's face with a plurality of pieces of face authentication data registered in the user list (S12). In a case where there is no matching face authentication data in the user list (S13: No), the face authentication process ends. In a case where there is matching face authentication data in the user list (S13: Yes), the determiner 114 refers to the user list, specifies the mobile terminal 2 associated with the matching face authentication data, and requests the communication controller 116 to connect to the mobile terminal 2.

Upon receiving the request, the communication controller 116 checks whether or not there is a currently connected mobile terminal 2 (S14). In a case where there is a currently connected mobile terminal 2 (S14: Yes), communication controller 116 disconnects communication with the currently connected mobile terminal 2 (S15). In a case where there is no currently connected mobile terminal 2 (S14: No), the processing in step S15 is skipped. The communication controller 116 connects to the mobile terminal 2 requested by the determiner 114 (S16).

The determiner 114 refers to the user list, and makes an AV source switching request to the function controller 117 as necessary. Upon receiving the AV source switching request, the function controller 117 switches the AV source according to the request. The function controller 117 acquires audio data or video data from the switched AV source, and causes the speaker 40 to output audio or causes the monitor 50 to display video.

In the example illustrated in FIG. 3, the registration information of the registrant No. 1 is mobile terminal name: AAA, hands-free call: use, music reproduction: present, video reproduction: absent, data communication: use, and AV source: mobile terminal 2. The registration information of the passenger No. 2 is mobile terminal name: BBB, hands-free call: use, music reproduction: absent, video reproduction: present, data communication: non-use, AV source: television broadcasting.

When the driver is switched from the registrant No. 1 to the registrant No. 2, the passenger detector 113 confirms matching between the feature data of the face of the passenger appearing at the position of the driver's seat in the image and the face authentication data: FR0002. The determiner 114 requests the communication controller 116 to disconnect from the mobile terminal AAA and connect to the mobile terminal BBB. After being connected to the mobile terminal BBB, the function controller 117 switches the AV source from the mobile terminal 2 to television broadcasting. The function controller 117 switches the seat position of the driver's seat to a position for the registrant No. 2. The function controller 117 switches the setting of the air conditioner to the setting for the registrant No. 2.

The function controller 117 can control the function of the mobile terminal 2 to which the connection is newly established via the communication controller 116. For example, the function controller 117 can switch the sound mode of the mobile terminal 2 to the silent mode.

The start of the process of FIG. 5 may be started at any timing, but is started when electric power is supplied to the vehicle hands-free control device 10 by starting the engine of the vehicle C1, for example. In addition, during a period in which power is supplied to the vehicle hands-free control device 10, the processing from step S10 to step S12 is periodically executed, and it is detected that the passenger appearing at the position of the driver's seat has changed.

EXAMPLE 2

Figure 6:
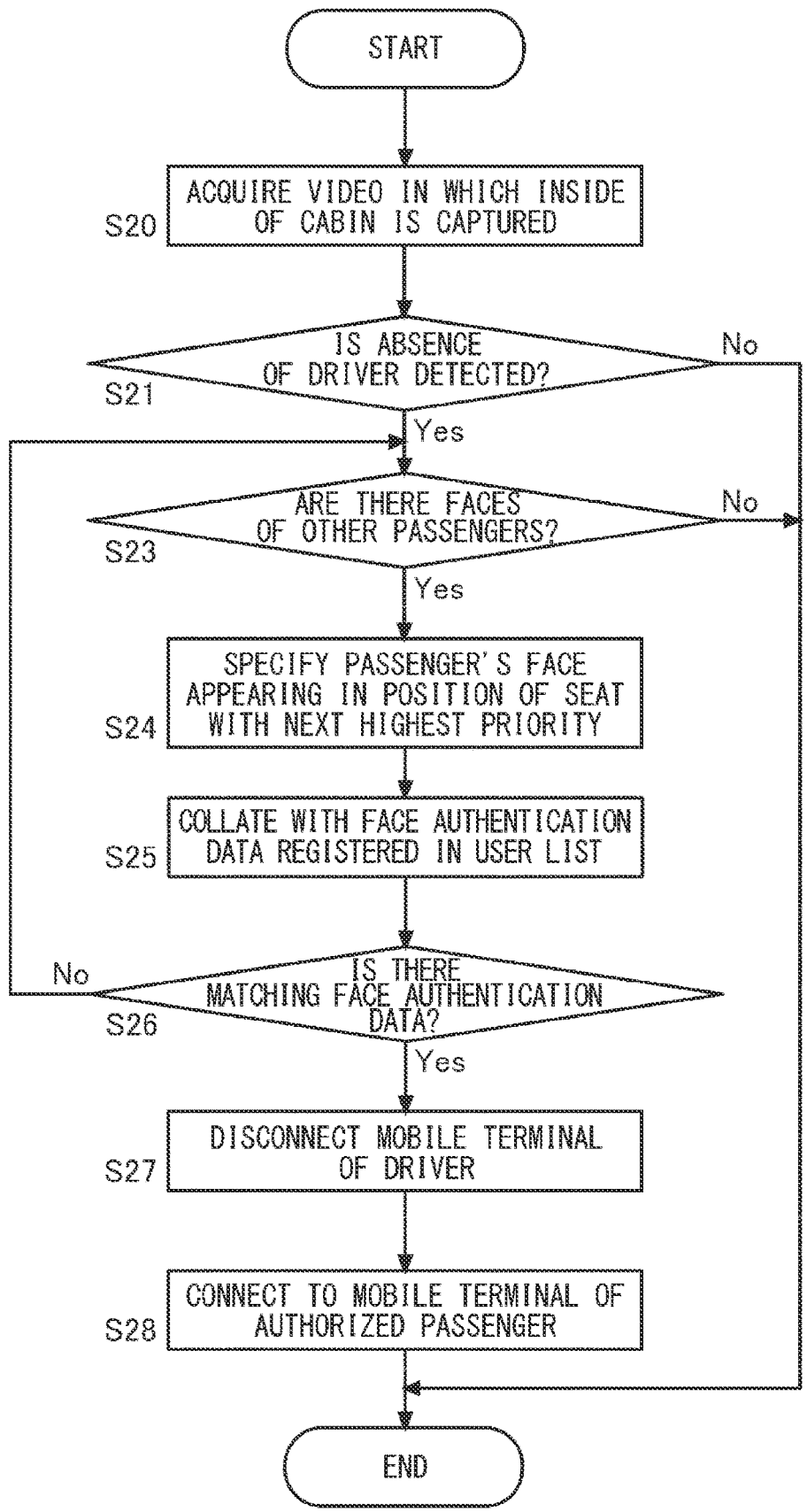
FIG. 6 is a flowchart illustrating a flow of a face authentication process of the vehicle hands-free control device according to Example 2.

FIG. 6 is a flowchart illustrating a flow of a face authentication process of the vehicle hands-free control device 10 according to Example 2. In the following description, a scene is assumed in which the vehicle C1 is stopped in a parking lot of a certain store and the driver leaves the vehicle C1 because the driver enters the store.

The processor 11 acquires a video of the inside of the cabin captured by the camera 20 (S20). When the absence of the driver is detected from the frame image of the acquired video (S21: Yes), the image recognizer 111 determines whether there is a face of another passenger not collated in the image (S23). In a case where there is no face of another passenger not collated (S23: No), the face authentication process ends. That is, a communicable state with the mobile terminal 2 of the driver is maintained.

In a case where there is another passenger's face that has not been collated (S23: Yes), the image recognizer 111 specifies the passenger's face appearing in the position of the seat with the next highest priority from the image (S24). The passenger detector 113 collates the specified feature data of the passenger's face with a plurality of pieces of face authentication data registered in the user list (S25).

In a case where there is no matching face authentication data in the user list (S26: No), the process proceeds to step S23, and the image recognizer 111 specifies the face of the passenger appearing at the position of the seat having the next highest priority from the image (S24). For example, in a case where the priority of the seat is set to driver's seat: 1, passenger seat: 2, right rear seat: 3, and left rear seat: 4, when the driver is absent, the face of the passenger is checked in the order of passenger seat→right rear seat→left rear seat.

In step S26, in a case where there is matching face authentication data in the user list (S26: Yes), the determiner 114 refers to the user list, specifies the mobile terminal 2 associated with the matching face authentication data, and requests the communication controller 116 to connect to the mobile terminal 2. Upon receiving the request, the communication controller 116 disconnects communication with the currently connected mobile terminal 2 of the driver (S27), and connects with the requested mobile terminal 2 (S28). The process of step S27 is skipped when the mobile terminal 2 of the driver is out of the communicable range by the near field communication and the communication is disconnected. The function controller 117 refers to the user list and switches to the setting environment of the passenger whose face is authenticated. For example, the passenger sitting on the passenger seat or the rear seat can respond to an incoming call from the mobile terminal 2 of the driver outside the vehicle C1 in a hands-free manner.

Note that, in a case where a plurality of microphones 30 is installed in the vehicle C1, the function controller 117 acquires the voice of the speaker in the vehicle C1 from the microphone 30 installed at the position closest to the seat on which the passenger who possesses the newly connected mobile terminal 2 sits during the hands-free call. Similarly, in a case where a plurality of speakers 40 is installed in the vehicle C1, the function controller 117 outputs the voice of the other party's speaker from the speaker 40 installed at the position closest to the seat during the hands-free call.

The function controller 117 can control the function of the mobile terminal 2 to which the connection is newly established via the communication controller 116. For example, the function controller 117 can switch the sound mode of the mobile terminal 2 to the silent mode.

Modification of Example 2

Figure 7:
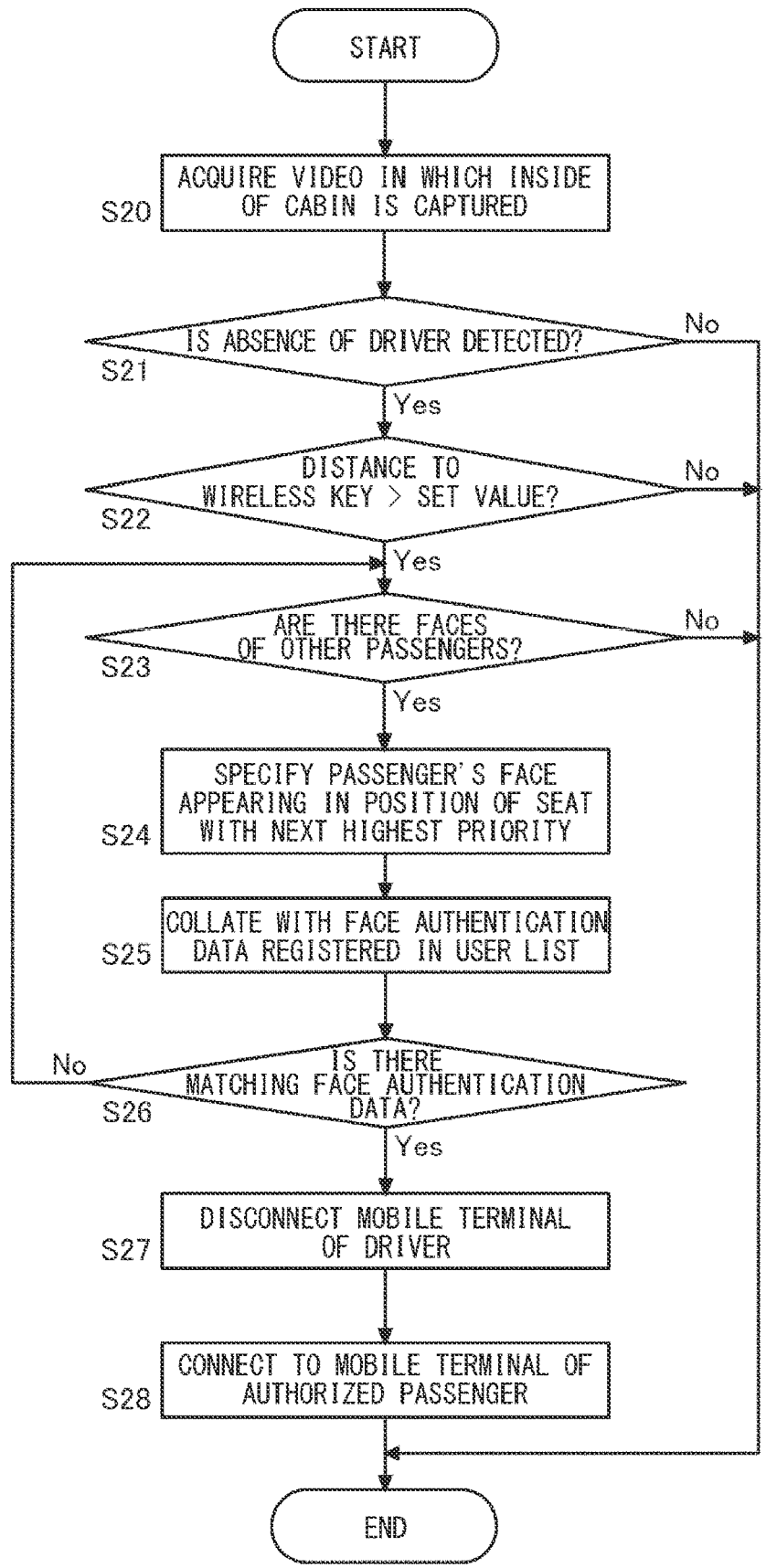
FIG. 7 is a flowchart illustrating a flow of a face authentication process of the vehicle hands-free control device according to a modification of Example 2.

FIG. 7 is a flowchart illustrating a flow of a face authentication process of the vehicle hands-free control device 10 according to a modification of Example 2. In the flowchart illustrated in FIG. 6, an example of a situation in which the driver gets off the vehicle C1 and the driver is absent has been described. From this situation, there is also a case where the driver who gets off immediately returns to the driver's seat. For example, there may be a case where the driver gets off once, unloads the luggage from the trunk, and immediately returns.

In the flowchart according to the modification illustrated in FIG. 7, step S22 is added to the flowchart illustrated in FIG. 6. When the image recognizer 111 detects the absence of the driver (S21: Yes), the determiner 114 acquires the radio wave intensity of the radio wave received by the receiver 5b from the wireless key 5a via the in-vehicle communicator 14. The determiner 114 estimates the distance between the receiver 5b and the wireless key 5a from the acquired radio wave intensity.

The determiner 114 compares the estimated distance to the wireless key 5a with the set value (S22). In a case where the distance to the wireless key 5a exceeds the set value (S22: Yes), the process proceeds to step S23, and the process is performed similarly to FIG. 6. The case where the distance to the wireless key 5a exceeds the set value includes a case where the receiver 5b cannot receive the radio wave from the wireless key 5a. In a case where the distance to the wireless key 5a is equal to or less than the set value (S22: No), the connection to the mobile terminal 2 of the driver is maintained without switching the mobile terminal 2 to be connected.

In the example illustrated in FIG. 7, the condition that the distance to the wireless key 5a exceeds the set value is used as the condition that the switching process of the mobile terminal 2 to be connected is activated after the absence of the driver is detected. In this regard, as the activation condition of the switching process, the fact that the set time has elapsed since the absence of the driver is detected may be used. In addition, an AND condition of both may be used as the activation condition of the switching process. In addition, as the activation condition of the switching process, it may be used that the distance from the vehicle hands-free control device 10 to the mobile terminal 2 possessed by the driver exceeds the set value. In addition, as the activation condition of the switching process, an AND condition that the distance to the mobile terminal 2 possessed by the driver exceeds the set value and that the set time has elapsed since the absence of the driver is detected may be used.

Even in a state where the driver is seated in the driver's seat, communication between the mobile terminal 2 and the vehicle hands-free control device 10 may be interrupted due to battery exhaustion, some trouble, an operation error, or the like of the mobile terminal 2 of the driver. In this case, when the communication controller 116 detects that the driver cannot communicate with the mobile terminal 2 without the condition of absence of the driver by the image recognizer 111, the switching process of the mobile terminal 2 to be connected in step S23 and subsequent steps may be activated.

As described above, according to the present embodiment, it is possible to improve the convenience of the passenger who possesses the mobile terminal 2 in the vehicle C1. Specifically, regardless of the previous driver, it is possible to automatically connect to the mobile terminal 2 of the current driver, and the inconvenience is reduced. Even when the driver is switched between family members, colleagues, or the like, automatic connection to the mobile terminal 2 of a new driver can be made. In addition, even in a case where the driver is away from the vehicle C1, it is possible to automatically connect to the mobile terminal 2 of the passenger sitting on the next highest priority seat, and to effectively use the hands-free function on the vehicle side. In addition, the user account name used in the mobile terminal 2 can be automatically input at the time of registration of the face authentication data.

The present invention has been described above based on the embodiments. It is to be understood by those skilled in the art that the embodiments are examples, various modifications can be made to combinations of the respective components and the respective processing processes, and such modifications are also within the scope of the present invention.

In the above-described embodiments, an example has been described in which the function controller 117 switches the sound mode of the mobile terminal 2 to which the connection is newly established to the silent mode via the communication controller 116. In this regard, the function controller 117 may change the function of the mobile terminal 2 to be controlled according to the boarding position of the passenger detected by the passenger detector 113. For example, the function controller 117 may switch the sound mode of the mobile terminal 2 of the passenger sitting in the driver's seat to the silent mode, and maintain the setting of the sound mode of the mobile terminal 2 of the passenger sitting in a seat other than the driver's seat.

In the above-described embodiments, the image recognizer 111 detects the face of the person in the frame image of the video input from the camera 20. In this regard, in order to identify an individual appearing in the image, biometric information other than the face may be set as the authentication target. For example, an iris appearing in the image may be used as the biometric information. In addition, when the passenger holds his/her palm over the camera 20, a fingerprint or a vein appearing in the image may be used as the biometric information.

In the above-described embodiments, a smartphone and a feature phone having a call function are assumed as the mobile terminal 2. In this regard, the mobile terminal 2 also includes a tablet, a portable music player, a portable game machine, and the like having no call function. Even when the hands-free function cannot be used, these mobile terminals 2 can be used as AV sources by being connected these mobile terminals 2 by near field communication.

What is claimed is:

1. A vehicle device comprising:
a passenger detector structured to identify a passenger on board a vehicle from a video captured by a camera that captures an inside of a cabin of the vehicle and specify a boarding position of the passenger identified;
a determiner structured to determine whether or not a mobile terminal associated with the passenger identified by the passenger detector is in a state of being connectable by near field communication;
a decider structured to decide a mobile terminal to be connected by the near field communication on a basis of boarding positions of a plurality of passengers associated with a plurality of mobile terminals in a case where there is the plurality of mobile terminals determined by the determiner to be in a state of being connectable by the near field communication; and
a communication controller structured to connect the mobile terminal decided by the decider and the vehicle device by the near field communication.

2. The vehicle device according to claim 1, wherein the decider decides, as the mobile terminal to be connected by the near field communication, a mobile terminal associated with a passenger sitting on a seat having a highest priority among seats on which passengers in the vehicle are seated.

3. The vehicle device according to claim 1, further comprising
a function controller structured to control a function of the mobile terminal connected by the near field communication from the vehicle device, wherein
the function controller changes a function of the mobile terminal to be controlled according to the boarding position of the passenger detected by the passenger detector.

4. The vehicle device according to claim 1, wherein
the communication controller continues connection with a mobile terminal of a driver in a driver's seat of the vehicle when a distance to a wireless key of the vehicle possessed by the driver is equal to or less than a set value even when the passenger detector cannot identify the driver of the vehicle in a state of being connected to the mobile terminal of the driver by the near field communication.

5. A method executed by a vehicle device, the method comprising:
identifying a passenger on board a vehicle from a video captured by a camera that captures an inside of a cabin of the vehicle and specifying a boarding position of the passenger identified;
determining whether or not a mobile terminal associated with the passenger identified is in a state of being connectable by near field communication;
deciding a mobile terminal to be connected by the near field communication on a basis of boarding positions of a plurality of passengers associated with a plurality of mobile terminals in a case where there is the plurality of mobile terminals determined to be in a state of being connectable by the near field communication; and
connecting the mobile terminal decided and the vehicle device by the near field communication.

* * * * *